United States Patent Office 3,424,439
Patented Jan. 28, 1969

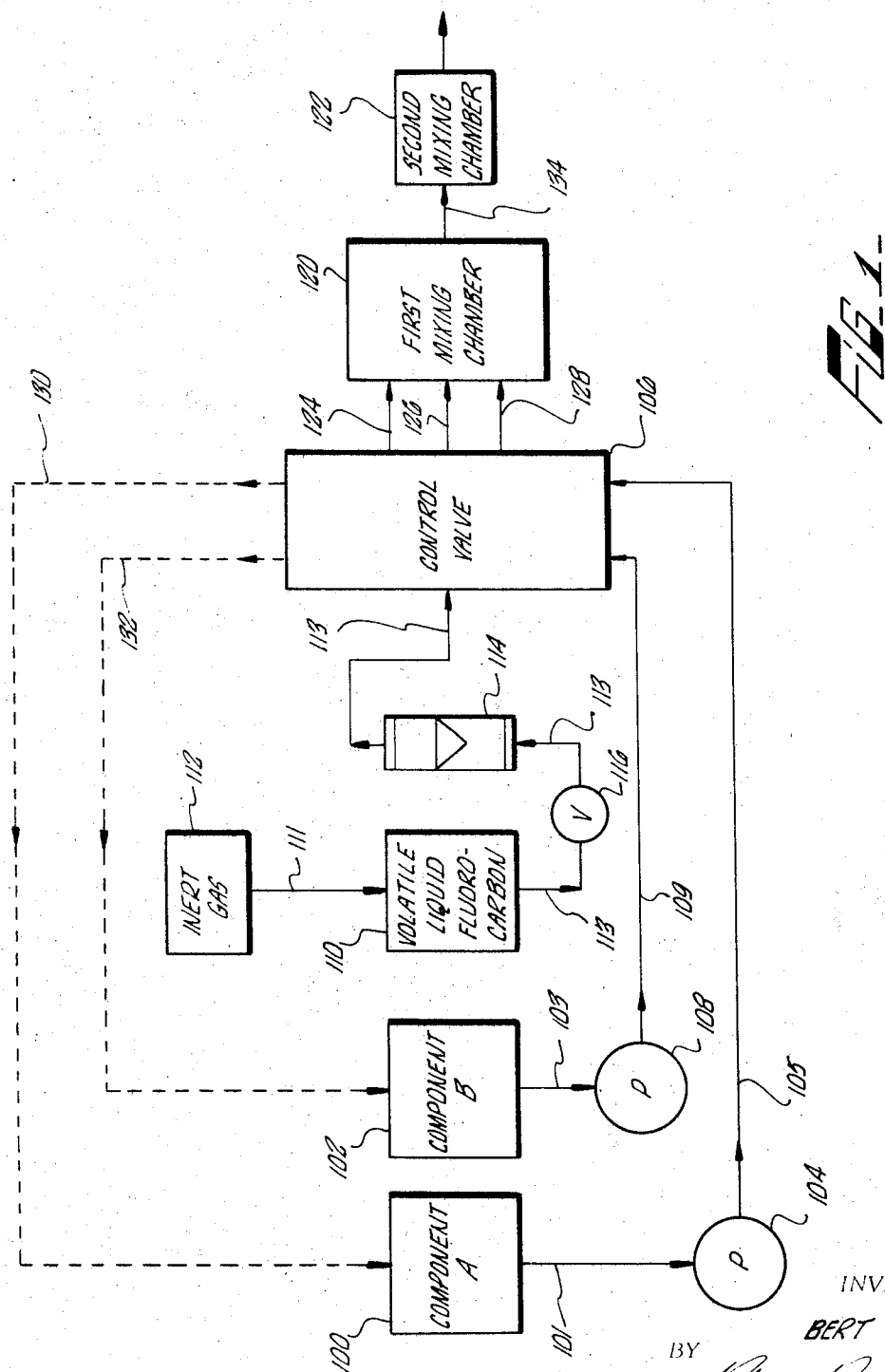

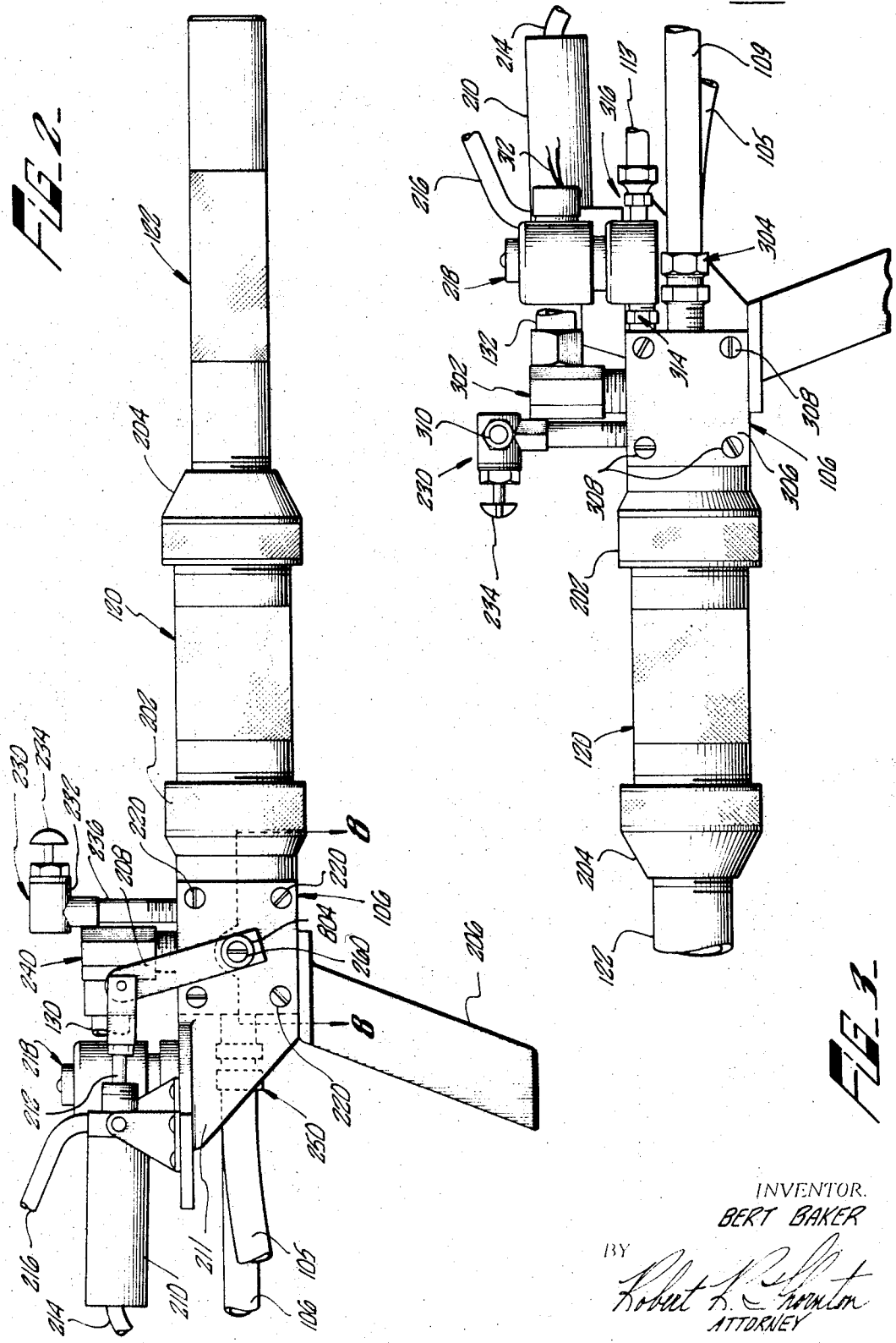

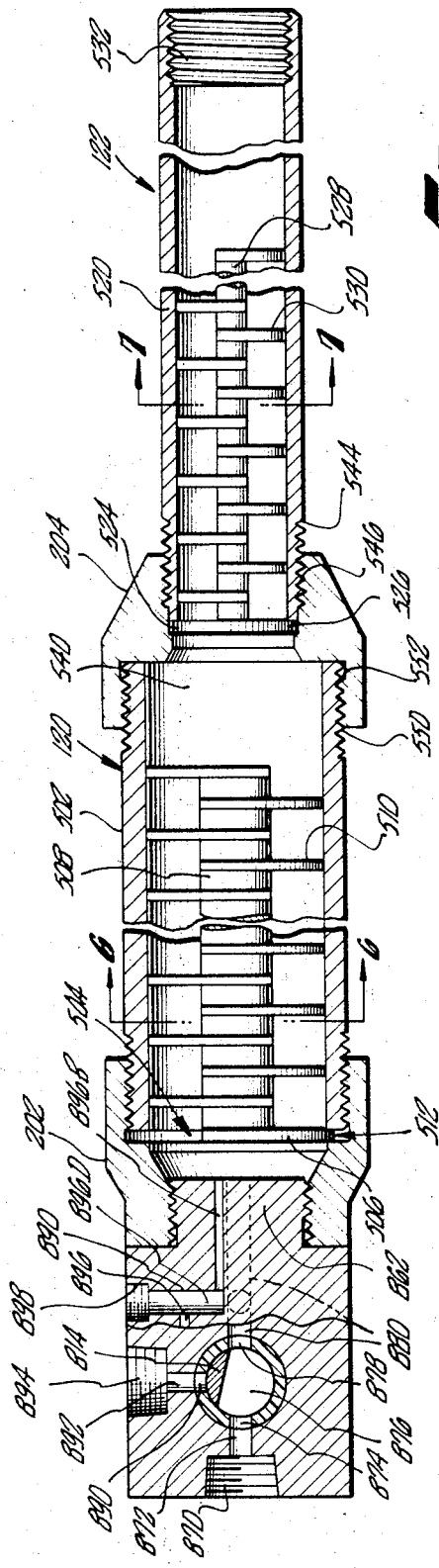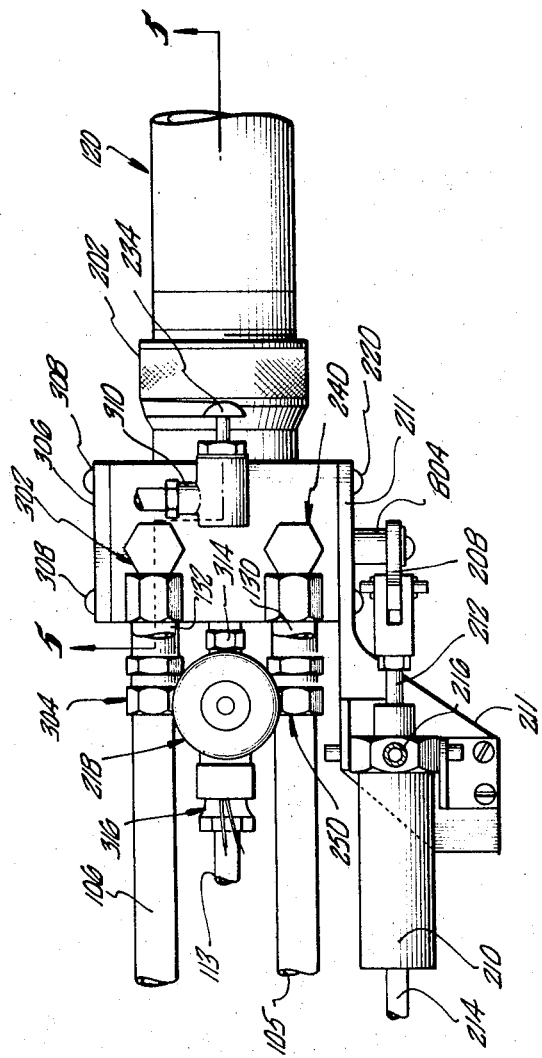

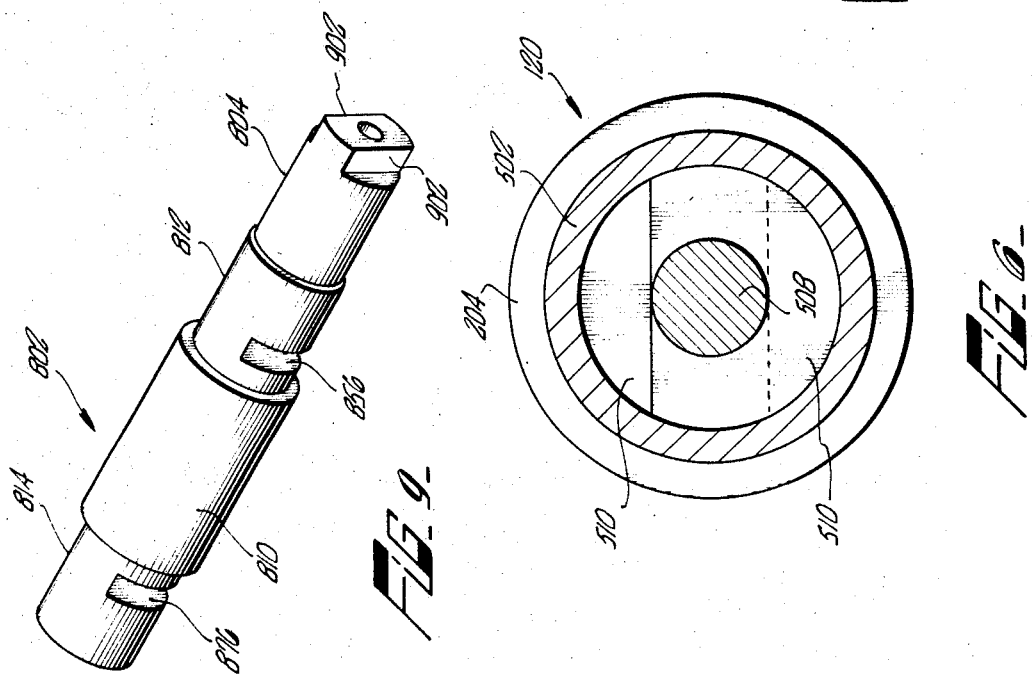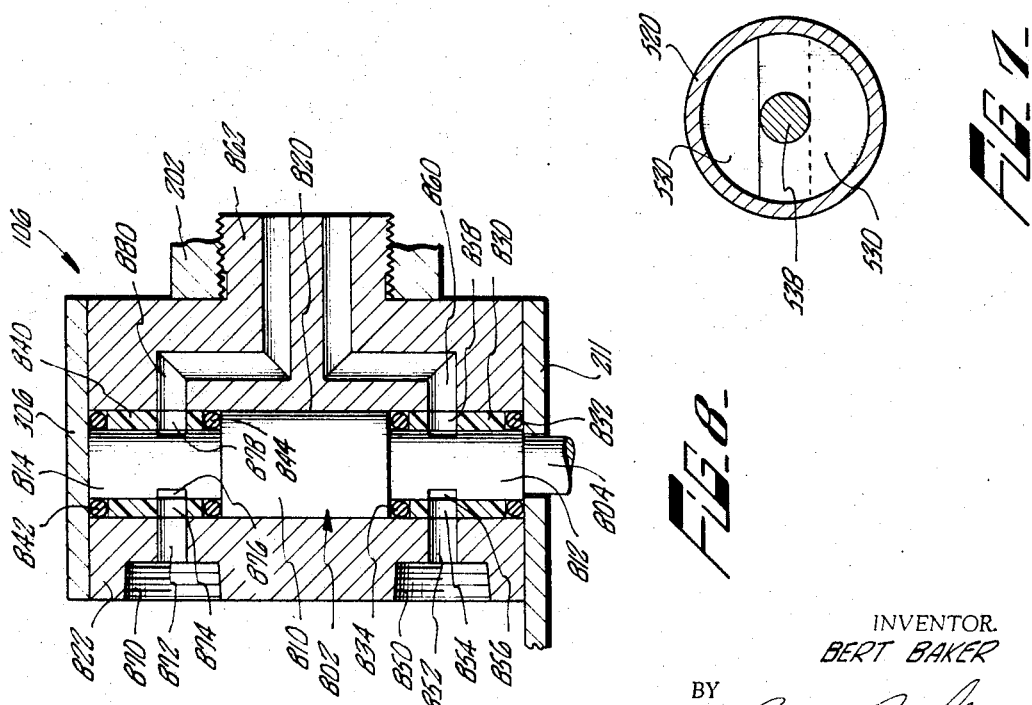

3,424,439
DEVICE FOR MIXING AND APPLYING FOAMS
Bert Baker, 15882 Wicklow Lane, Huntington Beach, Calif. 92647
Filed Nov. 29, 1967, Ser. No. 686,539
U.S. Cl. 259—4          12 Claims
Int. Cl. B01f *13/02*

ABSTRACT OF THE DISCLOSURE

A foam generating device or "gun" having metering means to which the sources of foam generating components are connected. The metering means, when actuated, applies the components to a first mixing chamber within which a series of baffles are disposed in alternate offset arrangement. The first mixing chamber is connected to a second mixing chamber of smaller cross-sectional area, also having baffling similarly disposed to control back-pressure, into which the component mixture passes and from which foam is emitted in a stream.

---

Various types of foam generating devices, commonly called "guns," have been utilized heretofore in the generation of foam at locations remote from the source of the foam generating components. However, commonly, such remote generating devices have been large in size and comparatively heavy, such as one hundred and fifty to two hundred and fifty pounds in weight. Also, while such devices have produced a foam of what heretofore has been considered light density, such foams still are considerably more dense than is necessary in view of the structural characteristics of the cured foam itself. In other words, the characteristics of the cured foam would permit, if it could be produced, a still less dense product while providing satisfactory structural characteristics.

According to the present invention, a foam generating device consists of first and second mixing chambers which are connected together by a fluid conduit which may be either short and rigid or long and flexible. Within each of the mixing chambers, which are preferably cylindrical in configuration, there is disposed a series of baffles in longitudinal array and alternate offset arrangement, so as to form a serpentine fluid flow path through each of the mixing chambers. Preferably, and more particularly with the cylindrical configuration, the baffles are parti-circular in configuration and are disposed in an axial array so as to provide the serpentine flow path. Metering means apply the foam generating components to the first mixing chamber, through which the components pass, accomplishing a portion of the desired mixing to produce foam generation. The partially mixed foam then passes into the second mixing chamber, of a smaller cross-sectional area than the first mixing chamber, through the fluid conduit connecting the two mixing chambers. Because of the relative compression resulting from the change in fluid chamber diameter, an increase in foam velocity is achieved and an inhibition of the foam expansion exists during passage through the second mixing chamber. The foam exits from the second mixing chamber for application as is desired. Thus, the foam can be poured, molded or the like, as appropriate for the particular utilization.

The invention may be more readily understood by referring to the accompanying drawings in which:

FIGURE 1 is a block diagram illustrating the operation of the device of the present invention;

FIGURE 2 is a right elevation of the device of the present invention, in one of its embodiments;

FIGURE 3 is a partial left elevation of the device shown in FIGURE 2;

FIGURE 4 is a partial plan view of the device shown in FIGURE 2;

FIGURE 5 is a partial left side elevation, in section, of the device shown in FIGURE 2, taken generally along lines 5—5 of FIGURE 4 for reference;

FIGURE 6 is a sectional view taken along lines 6—6 of FIGURE 5;

FIGURE 7 is a sectional view taken along line 7—7 of FIGURE 5;

FIGURE 8 is a view taken along lines 8—8 of FIGURE 2; and

FIGURE 9 is an isometric view of the valve actuable element shown in FIGURE 8.

Referring now to FIGURE 1, the operation of the device of the present invention will be described, for explanatory purposes, with respect to its utilization in the generation of a polyurethane resin and, more particularly of such a resin which may be described as a two-component, rigid, closed-cell, polyether urethane foam. Such foams are commercially available in component form from various chemical manufacturers under their respective trademarks. For example, one such foam is marketed by Reichold Chemicals, Inc. under the trademark "Polylite." Such products are sold in two component form, and the components being known simply as component A and component B. One of the components is basically an isocyanate, and the other is a polyol resin. Such products utilize various additional materials, most importantly for the present purposes, a volatile liquid fluorocarbon, such as dichlorodifluoromethane, commercially available under the trademark "Freon." An important characteristic of such volatile liquid fluorocarbons is to boil at approximately the ambient temperature, so that a slight positive pressure differential will maintain the material in its liquid state, but upon release of the foam into the atmosphere, the absence of the pressure differential, together with the heat resulting from the chemical reaction of the two components, permits the boiling and rapid expansion of the liquid fluorocarbon, thus producing an extremely light density foam and product.

In FIGURE 1, a container 100 and feed line 101 provide a source of component A, and a container 102 and feed line 103, a source of component B. A positive displacement pump 104 is fed from container 100 by any appropriate means, such as gravity, to produce a positive feed of component A through a feed line 105 to a control valve 106. A similar positive displacement pump 108 and feed line 109 provide a comparable feed of component B to the control valve assembly 106. A source of volatile liquid fluorocarbon 110 is pressurized through a pressure connection 111 from an inert gas container 112. Volatile liquid fluorocarbon from the container 110 is applied to the control valve 106 through a feed line 113, which includes a flow meter 114, and a control valve 116 to control the rate of flow.

A first mixing chamber 120 and a second mixing chamber 122 are utilized to mix together the component A, component B and volatile liquid fluorocarbon to produce the foam. Of course, if will be understood that if the foam generating components do not require the addition of the volatile liquid fluorocarbon, this element of the device may be eliminated. The component A, component B and volatile liquid fluorocarbon fluid streams applied to the control valve 106 are applied, without mixing, to the first mixing chamber 120 as is indicated by the three feed streams 124, 126, 128. The control valve 106 controls the application of these feed streams to the first mixing chamber and, when the control valve closes the feed streams 124, 126, 128, the component A and component B materials are recirculated back from the control valve 106 to their respective containers 100, 102, as is indicated by the dotted feed lines 130, 132. This recirculation by the control valve is provided in order to utilize positive displacement pumps 104, 108 without the necessity of providing shut-off of the pumps during non-generation of foam. Thus, by recirculation, once the system has been energized, foam is available instantaneously as desired and, similarly, generation of foam may be instantaneously terminated.

The foam generating components applied to the first mixing chamber are partially mixed in this chamber and passed to the second mixing chamber by means of a conduit 134. The conduit 134 may be either rigid or flexible, as will be discussed hereinafter. Component mixing is completed in the second mixing chamber while the volatile liquid fluorocarbon is maintained in a liquid state by means of the pressure resulting from the partial expansion of the foam, the expansion being restricted by the cross-sectional area of the second mixing chamber. The foam is emitted from the second mixing chamber and applied as desired according to the usage to be made of it.

From the foregoing, it will be apparent that the overall system can be broken down into several elements, according to function. Thus, a source of foam generating components is provided by the component sources 100, 102 and 112; metering means are provided by the positive displacement pumps 104, 108; the control valve 116 and the control valve assembly 106; and mixing is provided in the first mixing chamber 120 and second mixing chamber 122, which are connected together by the conduit 134. The utilization, as a function, of the component sources and metering means, when described in such breadth, is well-known in the prior art.

Referring now to FIGURE 2, there is shown a right side elevation of the control valve assembly 106 and mixing chambers 120, 122 illustrated in block diagram form in FIGURE 1. The control valve assembly, indicated generally at 106 in FIGURE 2, is connected to the first mixing chamber, indicated generally at 120, by a coupling 202, which is no more than a rigid hollow conduit. In FIGURE 2, the first mixing chamber 120 and second mixing chamber 122 are connected together by a rigid coupling 204. The couplings 202 and 204 are conventional in construction and are simply threaded on their inner surfaces in order to mate with complementary threads on the mixing chambers and control valve assembly. The control valve 106 has a handle 206 attached thereto by screws or the like (not shown), in order to provide a structure by which the device may be held and aimed, thus accounting for the terminology of the device as a "gun."

The valve assembly 106, as shown in FIGURE 2, consists of two principal control components, a solenoid valve and a valve actuable element. The valve actuable element (not shown, see FIGURES 8 and 9) is rotated between its on and off actuation states by movement of a valve crank 208, which is connected to a compressed air cylinder 210 by means of a piston arm assembly 212. A pair of compressed air inlets 214, 216 are utilized in conventional fashion to move a piston (not shown) within the cylinder 210 in order to control the movement of the piston arm assembly 212 and thus the crank 208. This control component is utilized to control the flow of the components delivered by the positive displacement pumps 104, 108.

A solenoid valve assembly 218 is utilized in conventional fashion to control, as an on-off control, the application of the volatile liquid fluorocarbon to the first mixing chamber. The solenoid assembly operation will be discussed in greater detail with respect to FIGURE 5. As will be seen in FIGURE 2, the air cylinder 210 is mounted on a mounting bracket 211, which also functions as a side plate to hold in place the valve actuable element heretofore referred to, see FIGURE 8, and is itself held in place by means of bolts 220 extending into the body of the valve assembly. Also shown in FIGURE 2 is a flushing valve control assembly 230 which is utilized, during recirculation of the A and B components, to flush the first and second mixing chambers so as to clear them of foam which would otherwise harden and block the chambers. The flush valve assembly 230 consists of a conventional on-off valve mounted in an L-assembly 232 and actuated manually by a valve lever 234. A threaded connector 236 extends between the flush valve 232 and the control valve body.

Also shown in FIGURE 2 adjacent the flush valve assembly is an L-connector 240 to which the A component recirculation line 130 is connected. In FIGURE 3, a similar connector 302 is shown, to which the B component line 132 is connected. Also shown is a connector 304 to which is connected the B component inlet line 109. An A component inlet connector 250 is shown in FIGURE 2 as being partially shielded by the bracket 211. A left side plate 306 in FIGURE 3 closes the valve body assembly by means of bolts 308 in a fashion similar to the bracket 211 and bolts 220 of FIGURE 2. Also shown in FIGURE 3, with respect to the flushing valve assembly 230, is the flushing valve fluid inlet 310. The solenoid valve 218 is seen to include a pair of actuating leads 312 and is connected to the valve body 106 by a coupling 314. An inlet fitting 316 connects the solenoid valve to the volatile liquid fluorocarbon inlet line 113.

FIGURE 4 illustrates the control valve assembly 106 in plan view so as to more clearly show the relative disposition of the various valve assembly elements heretofore described. Thus, by a comparison of FIGURES 2, 3 and 4, it will be seen that the respective component A and component B inlets and recirculation outlets are vertically aligned and that the volatile liquid fluorocarbon inlet is disposed between the component A and component B inlets. Also, the relative dispositions of the compressed air cylinder 210 and its mounting bracket 211 are shown.

FIGURE 5 is a right side elevation, generally in section, taken along lines 5—5 of FIGURE 4. The first mixing chamber 120, which is cylindrical in configuration by reason of being formed by a tubular mixing chamber shell 502, has an inlet 504 formed between the coupling 202 and a first mixing chamber inlet baffle 506. The first mixing chamber inlet baffle 506 is attached to a first mixing chamber baffle alignment rod 508. It will be seen that a plurality of additional first mixing chamber baffles 510 are also attached to the first mixing chamber baffle alignment rod 508. As shown in FIGURE 5, the baffle 506 and baffles 510 are connected to the rod 508 so as to be in an alternate offset disposition, thus forming a serpentine fluid flow path through the first mixing chamber commencing at the first mixture chamber inlet 504. As has heretofore been mentioned, the first mixing chamber shell 502 is threadably engaged with the coupling 202. It will be noted from FIGURE 5 that the baffles 510 are of a diameter such that, when attached to the rod 508, they engage alternate sides of the mixing chamber 120. Thus, the baffles 510 are of substantially the same diameter as the diameter of the mixing chamber, i.e., the inner diameter of the shell 502. However, the inlet baffle 506 is of a greater diameter, so that the peripheral portion of the inlet baffle 506 is engaged by and held firmly in contact between the coupling 202 and shell 502, as is indicted generally at 512. By reason of being connected to the rod 508, it will be seen that all of the baffles 506, 510 are maintained in axial alignment with respect to the bore of the shell 502.

The second mixing chamber 122 is of a construction similar to the first mixing chamber 120 just described. Thus, the second mixing chamber 122 has a shell 520 which is in threaded engagement with the rigid coupling 204. A second mixing chamber inlet 524 is formed by means of a second mixing chamber inlet baffle 526. A second mixing chamber baffle alignment rod 528 has a plurality of additional second mixing chamber baffles 530 connected thereto. The second mixing chamber shell 520 has a threaded portion 532 formed on the inner surface of the outlet portion thereof. The threaded portion 532 may be utilized to physically connect the second mixing chamber or the like, if desired, to any suitable connector, or may be omitted entirely.

As shown in FIGURE 5, the rigid coupling 204 directly connects the first mixing chamber 120, and more specifically an outlet portion 540 thereof, to the inlet 524 of the second mixing chamber. However, if desired, the second mixing chamber inlet 524 can be connected to the rigid coupling 204 by means of a flexible hose or the like so that the second mixing chamber is located remote from the first mixing chamber outlet portion 540. A conventional hose can be utilized, with the male connection engaging the rigid coupling 204 and the female connection engaging the shell 520 at a threaded portion 544 thereof.

As shown in FIGURE 5, it will be noted that this threaded portion 544 engages a complementary threaded portion 546 of the rigid coupling to provide the threaded engagement heretofore referred to. Similarly, if desired, the rigid coupling 204 may remain attached to the second mixing chamber shell 520, and the flexible conduit attached to the first mixing chamber shell 502 at a threaded portion 550 thereof which surrounds the first mixing chamber outlet. The opposite end of such a flexible conduit would then engage a threaded portion 552 of the rigid coupling 204, which threaded portion 550 formerly engaged, as shown in FIGURE 5. A third alternative for the utilization of the flexible coupling would be to have the cross-sectional area reduction compensation, which is provided by the rigid coupling 204, occur in the flexible conduit itself, either by an element similar to the rigid coupling 204 fitted in the flexible conduit or an actual reduction in the cross-sectional area of the flexible conduit itself.

It will therefore be seen that the function of the rigid coupling 204 is simply to connect together the first and second mixing chambers and to provide for the change in cross-sectional area between the two, and any other equivalent means for the accomplishment of this cross-sectional area reduction, such as a change in cross-sectional area of the first mixing chamber shell 502 or the second mixing chamber shell 520 may be utilized. However, the embodiment shown in FIGURE 5 is the presently preferred embodiment.

Referring now to FIGURE 6, which is taken along lines 6—6 of FIGURE 5, there is shown the cross-sectional configuration of the mixing chamber 210 and the configuration of the baffles 510. As will be apparent in FIGURE 6, a serpentine path for fluid flow is formed by having baffles of parti-circular configuration. By "parti-circular" is meant circular with a segmented portion of the circle removed. By such a configuration, when a cylindrical chamber is used, a reasonably close fit can be maintained between the baffles 510 and the inner face of the shell 502, so as to insure serpentine flow rather than a flow bypass between the baffles and the shell.

FIGURE 7 is a view similar to FIGURE 6, but taken along lines 7—7 of FIGURE 5, so as to illustrate the comparable baffle configuration in the second mixing chamber.

FIGURE 8 is a view, partially in section, taken along lines 8—8 of FIGURE 2, to illustrate in greater detail the inner configuration of the valve assembly 106 with respect to the feed of component A and component B materials. For purposes of clarity, certain of the elements, which would otherwise be shown in FIGURE 8, have been eliminated. A valve actuable element 802 is shown as extending transversely across the valve assembly 106. The valve actuable element 802 has a crank arm 804 which extends through the bracket 211 so as to engage the valve crank 208, as is shown in FIGURE 2. In actual structure, the crank arm 804 terminates in a pair of oppositely disposed flats 902 (see FIGURE 9) onto which the crank arm is mounted and held in place by a bolt 260 (see FIGURE 2).

The valve actuable element 802 consists of a central body portion 810 of somewhat greater diameter than a pair of actuating end elements 812, 814. The actuating end element 812 terminates in the crank arm 804 and is utilized to control the flow of component A material. The actuating end element 814 is similarly utilized to control the flow of component B material. The elements 812, 814 are seated in a transverse bore 820 which extends through a body portion 822 of the valve assembly 106, which is the transverse portion within which the valve actuable element 802 is disposed. A seal between the bore 820 and the elements 812, 814 is provided, respectively, by a sealing ring 830 disposed between a pair of O-rings 832, 834 and a sealing ring 840 disposed between a pair of O-rings 842, 844.

The component A inlet coupling 250 of FIGURE 2 threadably engages a component A coupling inlet 850, which terminates in a component A inlet passage 852. The seal ring 830 has a seal ring inlet aperture 854 formed therein opening onto a component A flow control recess 856 formed in the actuating end element 812. The seal ring 830 also has a component A mixing chamber inlet aperture 858 formed therein which opens into a component A outlet passage 860. The component A outlet passage 860 passes through a threaded valve body attachment neck 862, to which is attached the coupling 202 connecting the valve assembly 106 to the first mixing chamber 120.

The component B inlet coupling 304 of FIGURE 3 threadably engages a component B coupling inlet 870 which terminates in a component B inlet passage 872. The seal ring 840 has a B component seal ring inlet aperture 874 formed therein, opening onto a component B flow control recess 876 formed in the actuating end element 812. The seal ring 840 also has a component B mixing chamber inlet aperture 878 formed therein which opens into a component B outlet passage 880. The component B outlet passage 880 passes through the threaded valve body attachment neck 862.

FIGURE 9 is an isometric view of the valve actuable element 802. By reference to FIGURE 9, in conjunction with FIGURES 2, 5 and 8, the following description will explain the operation of the component A and component B feed control mechanism. Referring specifically to FIGURE 5, the valve actuable element is so positioned as to pass the component A and component B materials into the first mixing chamber. As will be seen from FIGURE 5, the component B flow control recess 876 permits a direct passage of component B material from the component B inlet passage 872 through the seal ring inlet aperture 874 and the flow control recess 876 and into the component B outlet passage 880, through the sealing ring inlet aperture 878. The component B material passes through the passage 880 into the first mixing chamber inlet 504.

Rotation of the valve assembly element 802 ninety degrees clockwise from the disposition shown in FIGURE 5 will cause the actuating end element 814 to close the passage formed by the sealing ring inlet aperture 878 and component B outlet passage 880, while opening a passage through a sealing ring recirculation aperture 890 and a component B valve body recirculation outlet 892. The component B recirculation connector 302 is attached to the body portion 822 at a threaded recess 894, so that a continuous passage is formed for the recirculation of component B material back to its source.

As heretofore mentioned, a solenoid actuated valve is utilized to control of the volatile liquid fluorocarbon flow into the valve assembly. A liquid fluorocarbon inlet passage is formed in the valve body 822 by means of a first inlet passage 896A and a second inlet passage 896B, connected together by a connecting passage 896C. The solenoid valve is attached to the valve body by a coupling in the same manner as the coupling heretofore described with respect to the component A and component B couplings. For manufacturing convenience, the liquid fluorocarbon passage is also utilized to apply the flushing fluid to the first mixing chamber. This dual utilization is possible since liquid fluorocarbon and flushing fluid are not simultaneously applied to the valve body 822, as the solenoid valve operates to shut off the flushing fluid supply prior to its actual application to the valve body 822. Thus, the liquid fluorocarbon passage 896C has an extension 896D which opens into a threaded recess 898, which engages the threaded connector 236.

The foregoing explanation is believed sufficient to illustrate the operation of the device of the present invention. Thus, again referring to FIGURE 1, prior to actual foam generation, the pumps 104, 108 are energized and the control valve 106 placed in the recirculate position, so that component A and component B materials are recirculated. Appropriate flow rate for the volatile liquid fluorocarbon is obtained as desired by adjustment of the valve 116. Foam generation then commences by opening the solenoid valve 218 and the control valve so as to apply fluorocarbon and component A and component B materials through the first mixing chamber. The volatile liquid fluorocarbon and component A and component B materials mix as they pass through the first and second mixing chambers and, as the mixture emerges from the second mixing chamber, the desired final expansion of the volatile liquid fluorocarbon occurs, thus producing the extremely light foam density.

By way of example, the pumps 104, 108 pump the A and B component materials in an approximate one to one ratio and the volatile liquid fluorocarbon is utilized in a ratio of six parts by weight to one hundred parts by weight of the total mixture. As a specific example of a utilization of the device, the first mixing chamber may use baffles two inches in diameter and have eight baffles spaced along an overall rod 508 length of five inches. The rod 508 may be thirteen-sixteenths of an inch in diameter and the total length of the shell 502 may be six inches in length. The second mixing chamber may utilize baffles one and one-quarter inches in diameter and have nineteen baffles spaced along a rod 528 which is six and one-fourth inches in length and five-sixteenths of an inch in diameter. The shell 520 may be ten inches in length. Utilizing such a device, a feed rate into the control valve 106 of thirty-five pounds per minute, produces satisfactory foaming and expansion, so that a product of two pounds density or less is readily achieved in a one and one-half inch thick panel. Furthermore, such a device has been found to reduce by as much as eighty percent the occurrence of "wormholes" common in froth foams conventionally produced.

Another particular advantage of the device of the present invention is the ability to produce such satisfactory foams while utilizing the flexible conduit heretofore referred to between the first and second mixing chambers. Thus, it is possible to use a flexible conduit of twenty-five or even fifty feet in length to separate the first and second mixing chambers, and still produce the improved foam product. Even though the "gun" of the present invention is many times lighter than those heretofore available, the utilization of the flexible conduit even further reduces the operating weight and increases the mobility of the device, by permitting the pouring of foam at locations remote from the first mixing chamber simply by moving the conduit and second mixing chamber as desired.

While the invention has been described with respect to the generation of urethane froth foams, and particular mention has been made of the component designations of a single manufacturer, it is to be understood that the device is not limited to the utilization of the products of a single manufacturer, but is generally utilizable with the products of any manufacturer in accordance with the recommendations of the manufacturer, to produce a product superior to that heretofore available in the art. Furthermore, the device may be utilized generally in the generation of any type of foam, and is not necessarily limited to the use of two component systems to produce urethane foams. Thus, additional components may be utilized in control circuitry, as such circuitry does not form a portion of the present invention in its broadest sense. Likewise, various other alternate structure of control valve assemblies may be utilized in conjunction with the mixing chambers of the present invention in its practice. For example, a single control can be utilized for the fluorocarbon and other components without departing from the essence of the invention.

The invention claimed is:

1. Apparatus for foam generation comprising:
   a source of foam generating components;
   a first mixing chamber having an inlet and an outlet;
   metering means connected between the source and the first mixing chamber inlet and operable to apply foam generating components from said source to said first mixing chamber inlet in a pre-selected ratio;
   a plurality of first mixing chamber baffles serially disposed in said first mixing chamber in an alternate offset arrangement;
   a second mixing chamber, of smaller cross-sectional area than said first mixing chamber, and having an inlet and an outlet;
   a plurality of second mixing chamber baffles serially disposed in said second mixing chamber in an alternate offset arrangement; and
   means forming a fluid conduit between the first mixing chamber outlet and the second mixing chamber inlet.

2. Apparatus according to claim 1, and in which the mixing chambers have a circular longitudinal cross-section configuration.

3. Apparatus according to claim 2, and in which the baffles are parti-circular in configuration and are axially mounted so as to form a serpentine fluid flow path through the mixing chambers.

4. Apparatus according to claim 3 and in which the first mixing chamber has a diameter twice the diameter of the second mixing chamber.

5. Apparatus according to claim 3 and in which the first mixing chamber outlet and the second mixing chamber inlet are disposed adjacent one another and the first and second mixing chambers are axially aligned.

6. Apparatus according to claim 3 and in which the first and second mixing chambers are remote from each other and are connected together by a flexible conduit.

7. Apparatus of claim 3 and including means for applying a flushing liquid to the first mixing chamber inlet.

8. Apparatus of claim 3 and in which the metering means includes a control valve assembly having an open and a closed condition and is operable, when in the open condition, to open conduits between the foam components and the first mixing chamber and is operable, when in the closed condition, to close said conduits and open recirculating conduits for the return of foam components to the source, and actuating means selectively operable to shift said valve assembly between the open and closed conditions.

9. Apparatus according to claim 8 and in which the first mixing chamber outlet and the second mixing chamber inlet are disposed adjacent one another and the first and second mixing chambers are axially aligned.

10. Apparatus according to claim 9 and in which the first mixing chamber has a diameter twice the diameter of the second mixing chamber.

11. Apparatus according to claim 8 and in which the first and second mixing chambers are remote from each other and are connected together by a flexible conduit.

12. Apparatus according to claim 11 and in which the first mixing chamber has a diameter twice the diameter of the second mixing chamber.

References Cited

UNITED STATES PATENTS

| | | | |
|---|---|---|---|
| 2,724,581 | 11/1955 | Pahl | 259—18 |
| 2,802,648 | 8/1957 | Christensen | 259—18 |
| 3,008,808 | 11/1961 | Hodges | 259—4 |
| 3,045,984 | 7/1962 | Cochran | 259—4 |
| 3,089,683 | 5/1963 | Thomas | 259—4 |
| 3,220,801 | 11/1965 | Rill | 23—252 |

ROBERT W. JENKINS, *Primary Examiner.*

U.S. Cl. X.R.

23—252